Oct. 13, 1970 S. H. CHARAP ETAL 3,534,257
NOISE REDUCED SIGNAL CONVERSION APPARATUS
Filed April 19, 1967 4 Sheets-Sheet 1

INVENTORS
STANLEY H. CHARAP
STEFAN ORSEN
BY Jefferson Ehrlich
ATTORNEY

NOISE REDUCED SIGNAL CONVERSION APPARATUS

Filed April 19, 1967 4 Sheets-Sheet 2

INVENTORS
STANLEY H. CHARAP
STEFAN ORSEN
BY
ATTORNEY

INVENTORS
STANLEY H. CHARAP
STEFAN ORSEN
BY
ATTORNEY

INVENTORS
STANLEY H. CHARAP
STEFAN ORSEN
BY
ATTORNEY

United States Patent Office 3,534,257

Patented Oct. 13, 1970

3,534,257
NOISE REDUCED SIGNAL CONVERSION APPARATUS

Stanley H. Charap, Madison Township, and Stefan Orsen, Jersey City, N.J., assignors to American Standard Inc., New York, N.Y., a corporation of Delaware Filed Apr. 19, 1967, Ser. No. 631,960
Int. Cl. G01r *17/06, 19/26*
U.S. Cl. 324—99 13 Claims

ABSTRACT OF THE DISCLOSURE

A ramp-type analog to digital converter for converting a low level analog voltage to a pulse count indicative of the magnitude of the analog voltage while substantially eliminating pulse count errors due to undesirable superimposed noise, such as 60 cycle per second noise and its harmonics. By utilizing a circuit arrangement which synchronizes a ramp signal with the 60 cycle noise signal so that the noise introduced by the 60 cycle signal will cause both ends of the ramp to shift in the same direction by the same amount, the effect of the noise signal will be cancelled so that the output of the converter will be substantially free of that noise factor.

This invention relates to an information translation system which converts an analog voltage into pulse count information for computer applications, with a maximum elimination of the noise effect.

More specifically, this invention relates to analog to digital conversion circuitry having a greatly improved input noise rejection.

In analog to digital converters utilizing ramp-type functions, the methods utilized to effect the rejection of input noise have been found to be very limited. The most troublesome noise entering the input of the converter is the 60 cycle per second noise acquired from conventional power sources. In ramp-type converters presently known in the art, this type of noise may be minimized to some extent by conventional methods such as by shielding, by using input filters, and/or by designing the input of the converter to have a low impedance at the frequency or frequencies to be suppressed. These methods, however, would usually be costly or objectionable because of the increased number of components required to effect the noise rejections, and generally they are inadequate to avoid the distortions due to the noise effects. Moreover, the addition of noise rejection components significantly reduces the accuracy and/or speed of the converter in operation.

Accordingly, the present invention relates to an analog to digital converter which is capable of rejecting or suppressing A.C. noise at its input without any front end filtering or integrating techniques. The circuitry of the converter synchronizes the ramp signal generated within the converter to the A.C. noise, sometimes called the "60 cycle" noise. The comparator utilizes a zero-crossing detector which produces a pulse each time the 60 cycle waveform goes through zero. These pulses are used to trigger a monostable multivibrator having a time constant set so that the output waveform is slightly shorter in time than the period of the 60 cycle waveform. The monostable waveform produced at the output of the multivibrator is used as a gate for the ramp generator so that a ramp is produced for every cycle of the 60 cycle waveform. The ramp which has been synchronized with the 60 cycle source is applied to two voltage comparators located in the conversion circuitry. The comparators also receive two D.C. out-of-phase signals from a so-called signal conditioner for the converter. The D.C. signals may also includes the undesirable 60 cycle per second noise.

Connected to the output of each comparator is a flip-flop circuit which becomes triggered by the pulses produced at the output of each comparator. The outputs of each flip-flop are fed into a logic circuit together with the output of a master oscillator. The master oscillator produces at its output a continuous train of timed pulses which, when in coincidence with the output of either/or both flip-flops, permits the pulses to pass to the output of the converter. This general arrangement—without any noise elimination circuitry—is shown and described in a copending application of Stefan Orsen, S.N. 375,570, filed June 16, 1964, entitled "Signal Conversion Apparatus," now U.S. Pat. No. 3,333,260, issued July 25, 1967.

If an undesirable 60 cycle noise signal is included with the signal applied to the input of the converter, then, according to the present invention, the noise signal will cause the operating points of the comparator circuits to shift an interval in time proportional to the magnitude of the noise signal. The undesirable noise signal will cause the operating points of both comparators to shift in the same direction by approximately the same amount so that, when the output signals are combined within the logic circuit, the net error produced at the output of the comparator will be substantially reduced if not completely nullified.

It is therefore an object according to the present invention to provide an analog to digital converter which substantially reduces errors caused by spurious 60 cycle noise signals introduced at its input.

It is another object according to the invention to provide an accurate and improved analog to digital converter which is simple in design, inexpensive to manufacture and reliable in operation.

It is still another object of this invention to measure a D.C. voltage and to eliminate the effect of an A.C. voltage which may be superimposed thereon by employing a ramp voltage for measuring the D.C. voltage upon which is superimposed the interfering A.C. voltage, and timing or marking two points of the ramp voltage so that the time interval between the two points will be independent of the superimposed A.C. voltage. And still another object of the invention is to generate recurring pulses and to gate the pulses so that the two above-mentioned points will fix the number of pulses which are to be employed in determining the magnitude of the D.C. voltage—substantially without any error due to the superimposed A.C. voltage.

Other objects and features of the present invention will become apparent from the following detailed description considered in connection with the accompanying drawings, which schematically disclose an embodiment of the present invention. It should be understood however, that the drawings are designed for the purpose of illustration only, and not as a definition of the limits of the invention as to which reference should be made in the appended claims.

In the drawings wherein similar reference characters denote similar elements throughout the several views.

Figure 1:
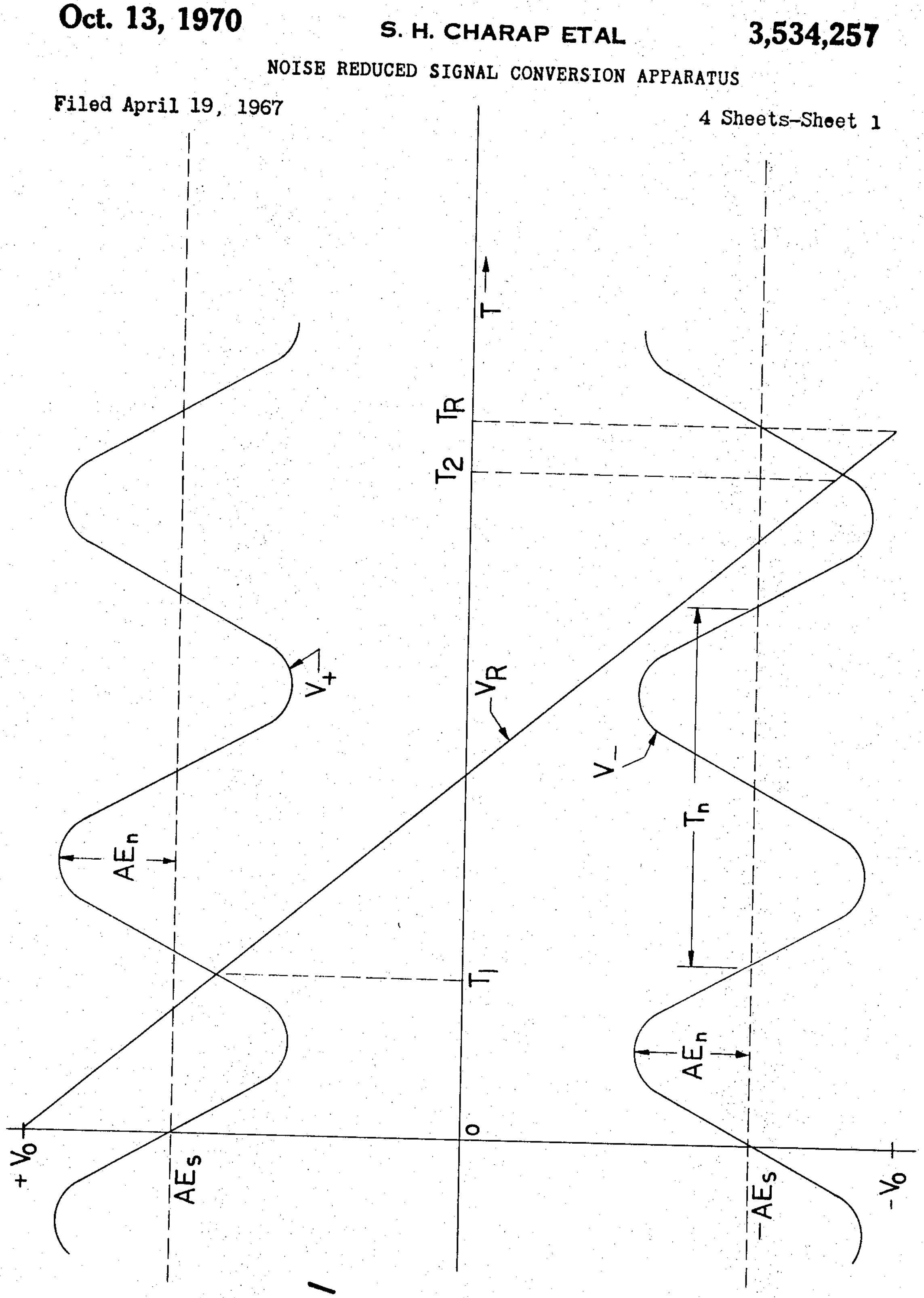
FIG. 1 illustrates the direct and inverted output signals of the signal conditioner for the converter (which may include appropriate D.C. amplifiers) and the ramp voltage as presented to the input of the comparator circuits.
Figure 3:
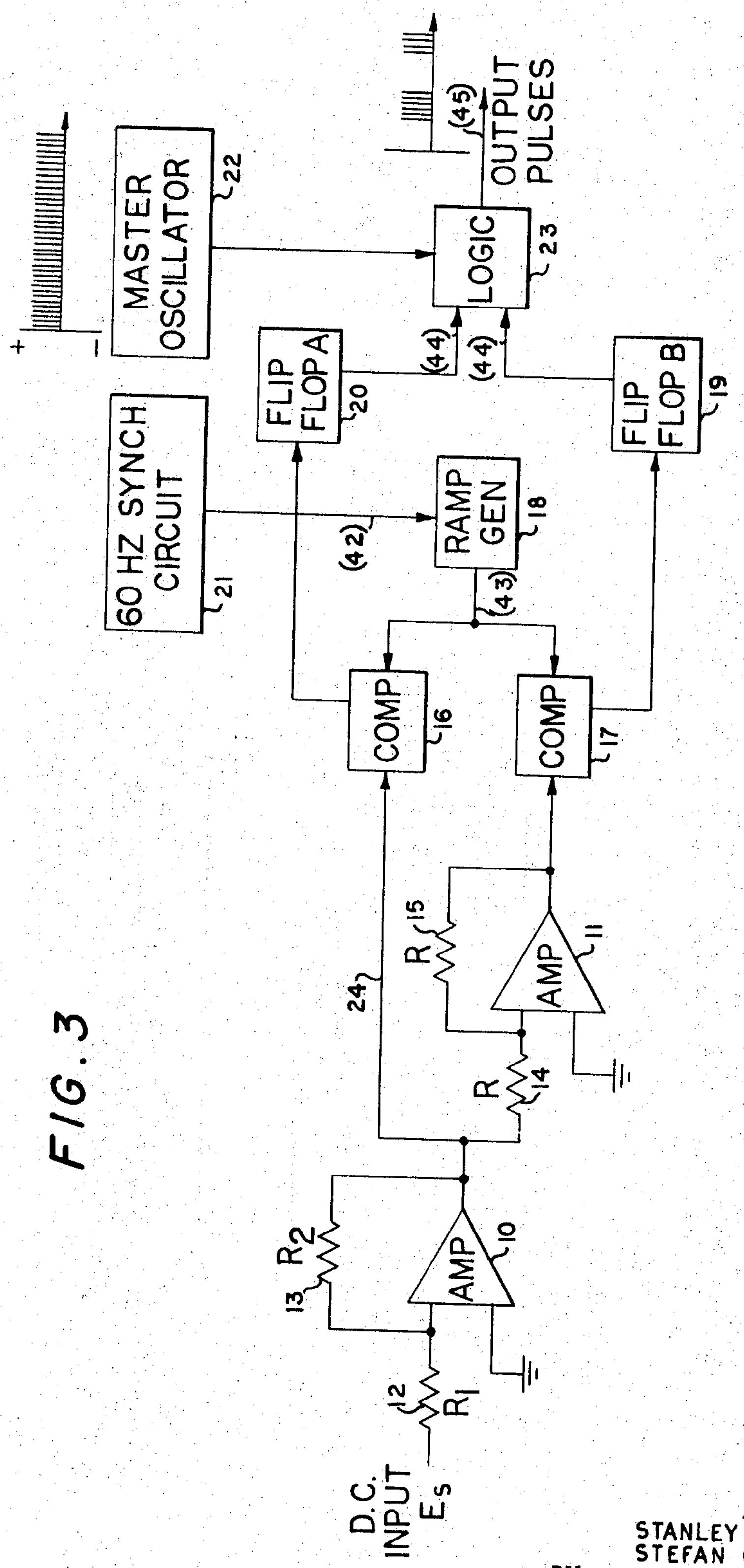
FIG. 3 is a block diagram, partly in schematic form, of an embodiment of the converter according to the invention.

Referring to FIG. 1, when a signal $E_s$ is applied to the input of the converter according to the invention, the direct and inverted outputs of the amplifiers of the converter produce the signals $AE_s$ and $-AE_s$ where A represents the gain of the amplifier. The noise signal is monochromatic at frequency $W_n$ and superimposed upon the signals so that the output of amplifier 10, as shown in FIG. 3, is:

$$V_+=AE_s+AE_n \sin (W_n t+\phi) \quad (1)$$

and the inverted output at the output of amplifier 11 of FIG. 3 is $$V_-=-V_+ \quad (2)$$

The time $t$ is measured from the start of the ramp signal produced by ramp generator 18 of FIG. 3, so that $\phi$, is the phase of the noise signal at the start. The ramp voltage is given by:

$$V_R=V_0-\alpha t \quad (3)$$

where $V_0$ is the maximum positive value of the ramp voltage. $V_0$ has some convenient value larger than $AE_s^{max}$, where $E_s^{max}$ is the full-scale reading of the meter. This equation applies only when $0 \leqq t \leqq t_R$, where $t_R$ is the ramp period. The ramp ends at $V_R=-V_0$ when $t=t_R$, so that $$\alpha=\frac{2V_0}{t_R} \quad (4)$$

The times $t_1$ and $t_2$ mark the interval during which pulses are counted, thereby converting the analog voltage to a digital time measurement. These times $t_1$ and $t_2$ are defined by the equations $$V_0-\alpha t_1=A[E_s+E_n \sin (w_n t_1+\phi)] \quad (5)$$

$$V_0-\alpha t_2=-A[E_s+E_n \sin (w_n t_2+\phi)] \quad (6)$$

If there is no superimposed noise, i.e. $E_n=0$, then these equations reduce to $$V_0-\alpha t_1=AE_s \quad (7)$$
$$V_0-\alpha t_2=-AE_s$$

If the two Equations 7 are added and subtracted, the following is obtained respectively;

$$2V_0-\alpha(t_2+t_1)=0$$
$$\alpha(t_2-t_1)=2AE_s$$

or $$t_2+t_1=\frac{2V_0}{\alpha}=t_R \quad (8)$$

$$t_2-t_1=\frac{2A}{\alpha}E_s \quad (9)$$

Equation 9 reveals the scale factor relating the time measurement to the input signal voltage. Equation 8 shows that the sum of $t_2$ and $t_1$ remains constant. This is the key to normal mode noise rejection in a ramp type digital volt meter. To see this, assume that $$t_2+t_1=t_R \quad (10)$$

in the presence of superimposed noise, provided $E_n$ is small. The quantitative meaning of this will be discussed later.

The noise signal measured at time $t_1$ is $$AE_n \sin (w_n t_1+\phi)=AE_n[\sin w_n t_1 \cos \phi + \cos w_n t_1 \sin \phi] \quad (11)$$

and that measured at time $t_2$ is $$-AE_n \sin (w_n t_2+\phi)=+AE_n \sin [w_n t_1-(w_n t_R+\phi)]$$
$$=AE_n[\sin w_n t_1 \cos (w_n t_R+\phi) - \cos w_n t_1 \sin (w_n t_R+\phi) \quad (12)$$

utilizing Equation 10 and the trigonometric identities:

$$\sin (a \pm b)=\sin a \cdot \cos b \pm \cos a \cdot \sin b$$

The noise is rejected if the noise signals at times $t_1$ and $t_2$ are equal. The difference between these signals is $$diff=AE_n\{\sin w_n t_1[\cos \phi-\cos (w_n t_R+\phi)] + \cos w_n t_1[\sin \phi+\sin (w_n t_R+\phi)]\} \quad (13)$$

If this difference is to vanish for an arbitrary signal $E_s$, i.e. for arbitrary $t_1$, then it is required that simultaneously, $$\cos \phi=\cos (w_n t_R+\phi) \quad (14a)$$

and $$\sin \phi=-\sin (w_n t_R+\phi) \quad (14b)$$

To solve these equations, (1) Equation 14*a* is divided by Equation 14*b*

$$\tan (w_n t_R+\phi)=-\tan \phi \quad (15)$$

(2) The angle B is introduced; if $p$ and $q$ are integers $$\tan (p\pi-B)=-\tan B$$

and $$\tan (q\pi+B)=\tan B$$

so that Equation 15 can be satisfied by setting $$\phi=p\pi-B$$
$$w_n t_R+\phi=p\pi+B$$

(3) Adding these equations, then $$w_n t_R+2\phi=(p+q)\pi=r\pi(r=\text{integer})$$

It can be shown that only the even integers $r$ correspond to solutions of the original Equations 14*a* and 14*b*. Thus, under the assumption of Equation 10, normal mode noise is rejected by the ramp technique if the ramp period $t_R$ and the noise frequency $w_n$ and phase $\phi$ are related by $$\tfrac{1}{2} w_n t_R+\phi=m\pi; m=\text{integer} \quad (16)$$

A simple method for accomplishing this is to start the ramp as the noise signal crosses zero, i.e. $\phi=0$ or $\pi$ and, choose $t_R$ to be an integral multiple of the noise period $t_n(w_n=2\pi/t_n)$.

Figure 2:
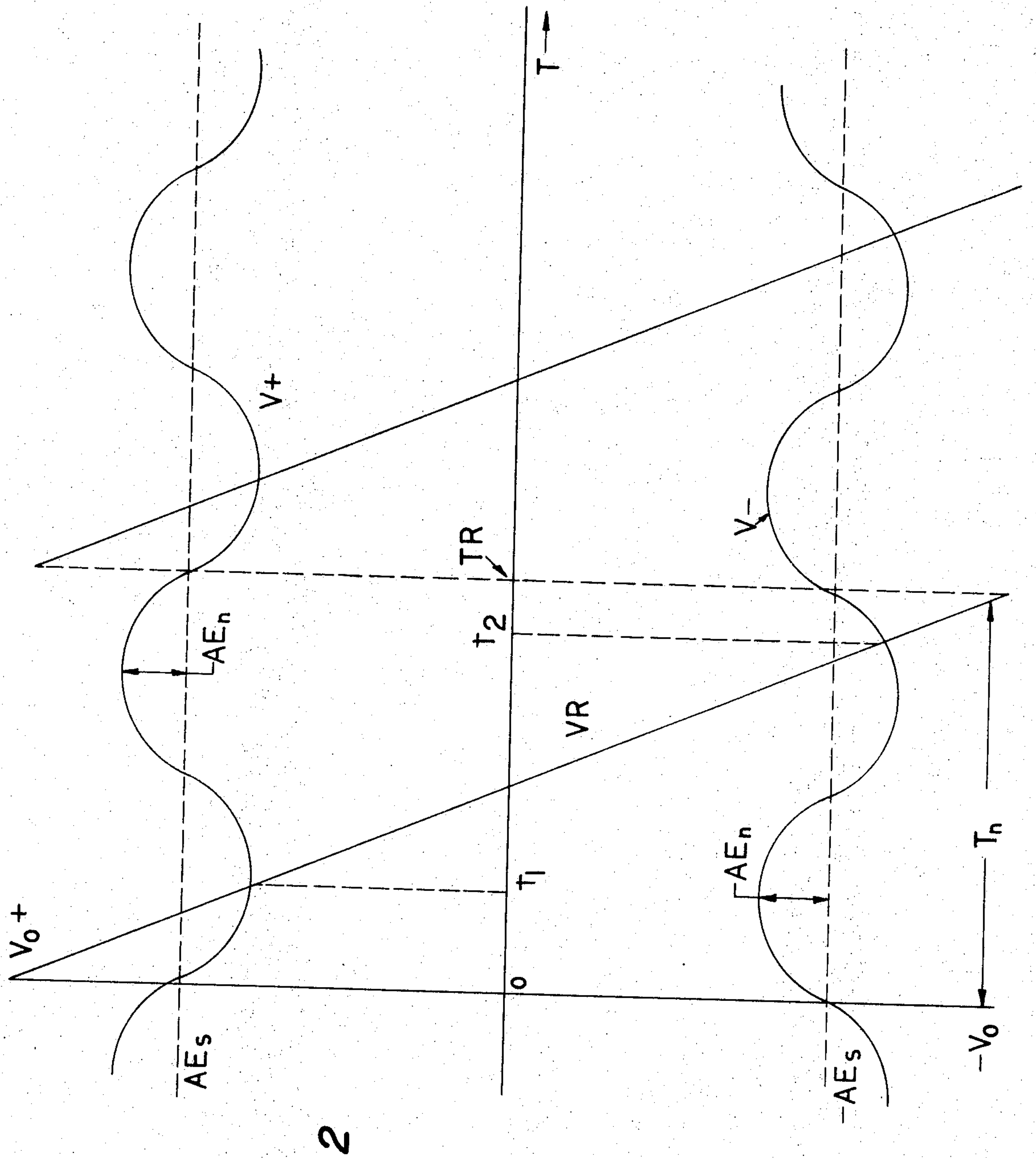
FIG. 2 illustrates the application of a ramp voltage to a single cycle, for example, of the noise voltage.

In FIG. 1, $t_R$ is illustrated to be two noise periods. In FIG. 2, however, $t_R$ is illustrated to be a single noise period. It is also convenient to set the phase $\phi$ equal to a half integer multiple of $\pi$, i.e. to start the ramp as the noise reaches a peak value and then to have $t_R$ equal a half noise period.

To obtain a more detailed analysis of the normal mode noise rejection, it is necessary to return to Equations 5 and 6. Adding and subtracting these equations one obtains respectively, $$\frac{t_2+t_1}{2}=\frac{V_0}{\alpha}+\frac{AE_n}{\alpha}\sin\left(w_n\frac{t_2-t_1}{2}\right)\cdot\cos\left(w_n\frac{t_2+t_2}{2}+\phi\right) \quad (17)$$

and $$\frac{t_2-t_1}{2}=\frac{AE_s}{\alpha}+\frac{AE_n}{\alpha}\cos\left(w_n\frac{t_2-t_1}{2}\right)\cdot\sin\left(w_n\frac{t_2+t_1}{2}+\phi\right) \quad (18)$$

where the trigonometric identities $$\sin a \pm \sin b=2 \sin \frac{a \pm b}{2} \cos \frac{a \mp b}{2}$$

have been used. Substitute for $\alpha$ from Equation 4, then $$\frac{t_1+t_1}{2t_R}=\tfrac{1}{2}+\tfrac{1}{2}\frac{AE_n}{V_0}\sin\left(w_n t_R\frac{t_2-t_1}{2t_R}\right)\cdot\cos\left(w_n t_R\frac{t_2+t_2}{2t_R}+\phi\right) \quad (19)$$

and $$\frac{t_2-t_1}{2t_R}=\tfrac{1}{2}\frac{AE_s}{V_0}+\tfrac{1}{2}\frac{AE_n}{V_0}\sin\left(w_n t_R\frac{t_2-t_1}{2t_R}\right)\cdot\sin\left(w_n t_R\frac{t_2+t_1}{2t_R}+\phi\right) \quad (20)$$

In the first approximation $$\frac{t_2+t_1}{2t_R}=\frac{1}{2}$$

and Equation 20 becomes $$\frac{t_2-t_1}{2t_R}=\frac{1}{2}\frac{AE_s}{V_0}+\frac{1}{2}\frac{AE_n}{V_0}\cos\left(w_nt_R\frac{t_2-t_1}{2t_R}\right)\cdot\sin\left(\frac{w_nt_R}{2}+\phi\right) \tag{21}$$

Thus, the first order noise signal vanishes under the condition given by Equation 16.

The second order noise contribution to $t_2-t_1$ is now to be calculated. Let $$X=\frac{t_2-t_1}{2t_R} \tag{22}$$

and $$y=\frac{t_2+t_1}{2t_R}-\frac{1}{2} \tag{23}$$

The new variable $y$ is expected to be a small number. Equation 19 becomes $$y=\frac{1}{2}\frac{AE_n}{V_0}\sin(w_nt_Rx)\cos\left(w_nt_Ry+\frac{w_nt_R}{2}+\phi\right) \tag{24}$$

and Equation 20 becomes $$X=\frac{1}{2}\frac{AE_s}{V_0}+\frac{1}{2}\frac{AE_n}{V_0}\cos(w_nt_RX)\cdot\sin\left(w_nt_Ry+\frac{w_nt_R}{2}+\phi\right) \tag{25}$$

For small $y$ approximates with Equation 16 satisfied $$\sin\left(w_nt_Ry+\frac{w_nt_R}{2}+\phi\right)\approx w_nt_Ry\cos\left(\frac{w_nt_R}{2}+\phi\right)=\pm w_nt_Ry$$

and $$\cos\left(w_nt_Ry+\frac{w_nt_R}{2}+\phi\right)\approx\cos\left(\frac{w_nt_R}{2}+\phi\right)=\pm 1$$

Thus Equation 24 becomes $$y\approx\pm\frac{1}{2}\frac{AE_n}{V_0}\sin\left(w_nt_R\frac{1}{2}\frac{AE_s}{V_0}\right)$$

and Equation 25 becomes $$\frac{t_2-t_1}{2t_R}\approx\frac{1}{2}\frac{AE_s}{V_0}+\left(\frac{AE_n}{2V_0}\right)^2\cdot\frac{w_nt_R}{2}\sin\left(w_nt_R\frac{AE_s}{V_0}\right) \tag{26}$$

The first order noise has been rejected by satisfying Equation 16. The remaining contribution varies as the square of $$\frac{AE_n}{2V_0}$$

the ratio of the noise signal to twice the full scale reading of the meter, and also increases approximately linearly as the ramp period. The remaining contribution also varies sinusoidally with the applied D.C. signal $E_s$.

According to the above discussion, the noise signal must be much less than full scale. If the signal being measured is also very small, then consider Equations 24 and 25 with $\frac{1}{2}w_nt_R=\pi$, $\phi=0$, $$y=-\frac{1}{2}\frac{AE_n}{V_0}\sin(2\pi x)\cos(2\pi y) \tag{27}$$

$$x=\frac{1}{2}\frac{AE_s}{V_0}-\frac{1}{2}\frac{AE_n}{V_0}\cos(2\pi x)\sin(2\pi y) \tag{28}$$

It is assumed at the outset that $$\frac{AE_n}{V_0}\ll 1$$

In this case it is considered as well that $E_s$ is of the same order of magnitude as $E_n$. Then the approximations $$\sin 2\pi x\approx 2\pi x;\ \sin 2\pi y\approx 2\pi y$$
$$\cos 2\pi x\approx 1;\ \cos 2\pi y\approx 1 \tag{29}$$

are valid. Then $$y=-\pi\frac{AE_n}{V_0}x \tag{30}$$

and $$X=\frac{1}{2}\frac{AE_s}{V_0}-\pi\frac{AE_n}{V_0}y \tag{31}$$

Combining these equations, then $$X=\frac{\frac{1}{2}\frac{AE_s}{V_0}}{1-\left(\pi\frac{AE_n}{V_0}\right)^2} \tag{32}$$

so that the noise is still rejected to first order. Moreover, the noise is more strongly rejected in the small signal case than when the signal is large.

Figure 4:
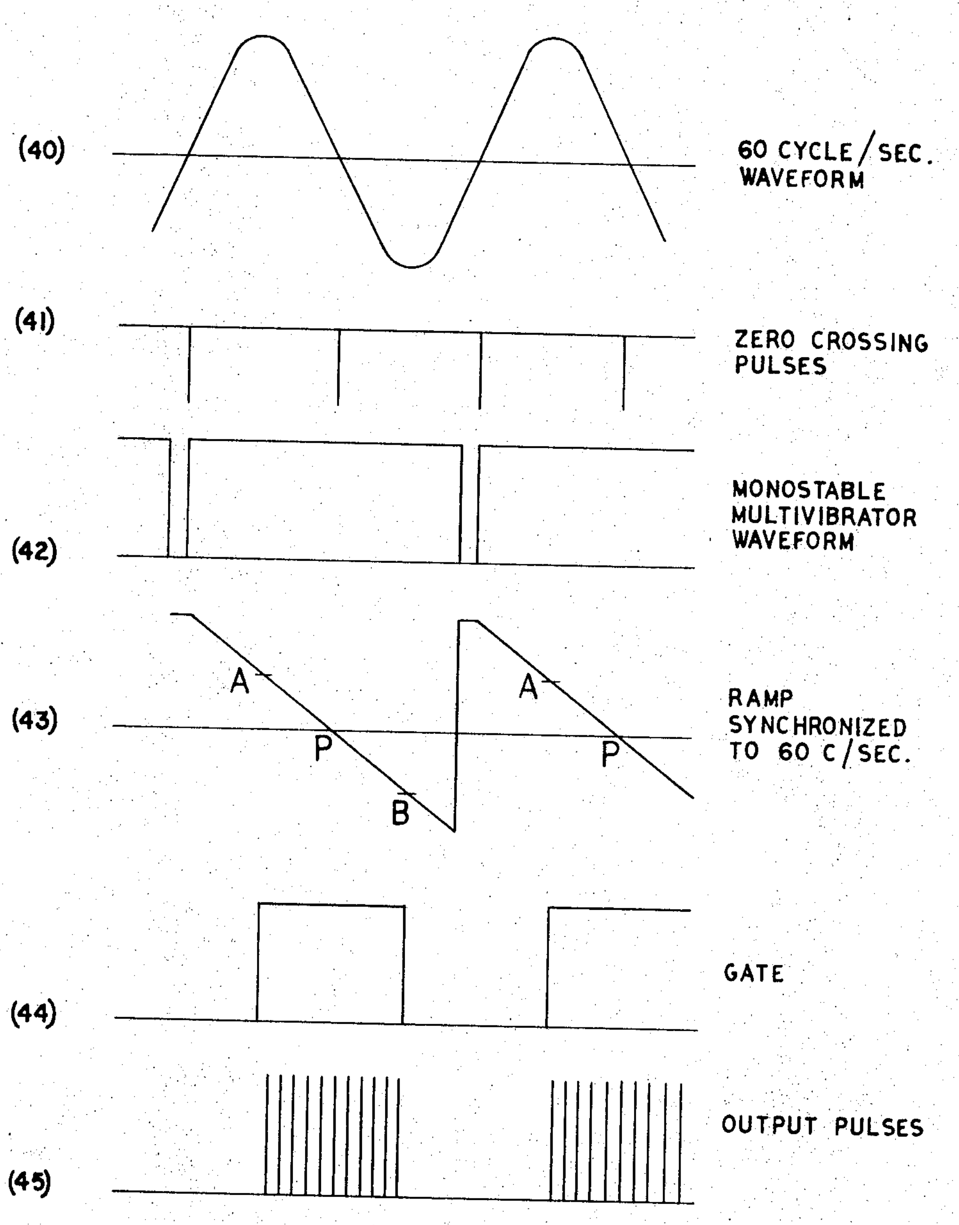
FIG. 4 illustrates, with respect to time, signals generated at the output of each of the components of the converter of FIG. 3.

Referring to FIGS. 3 and 4, a block diagram partly in schematic of an embodiment of the converter is shown (FIG. 3) together with illustrations of the output signals of many of the circuit components (FIG. 4). The DC input signal $E_s$ is applied to amplifier 10 through resistor 12. Amplifier 10 is a typical high-gain DC amplifier having a gain A determined by $R_2/R_1$, the ratio of the values of resistor 13 with respect to resistor 12. The output of amplifier 10 containing signal $AE_s$ and $AE_n$, the term $AE_n$ constituting a quantity of undesirable 60 cycle noise, is fed through line 24 into the input of comparator 16. Another portion of the output of the amplifier 10 is fed through resistor 14 into the input of amplifier 11. As is shown in the art when the value of resistor 15 is made to equal resistor 14, the output of amplifier 11 will be identical in magnitude to the output of amplifier 10 but 180° out of phase when introduced into the input of comparator 17.

The 60-cycle synchronizing circuit 21 is connected to a 60 cycle noise source (which need not be shown) having a wave shape as shown on line 40 of FIG. 4, and includes a zero-crossing detector (the details of which are obvious and need not be shown) which produces a pulse, as shown on line 41 of FIG. 4, each time the 60 cycle waveform passes through zero. These pulses are utilized to trigger a monostable multivibrator within circuit 21 having a time constant which is slightly shorter than the period of the 60 cycle waveform (shown on line 42 of FIG. 4) and the output of the multivibrator appears at the output of circuit 21. The monostable waveforms are utilized as a gate when fed into the input of ramp generator 18 so that a ramp signal is produced at output line 43 (see FIG. 4) for each cycle of the 60 cycle waveform. Ramp generator 18 generates a linear ramp signal 43 having a fixed and predetermined slope during the time interval of each synchronized multivibrator pulse. The output of ramp generator 18 is fed into comparators 16 and 17 together with the direct and inverted output signals of amplifier 10 with the 60 cycle noise signal superimposed thereon.

If the input DC signal were equal to zero ($E_s=0$), comparators 16 and 17 would operate simultaneously at point P on ramp signal 43. If a DC input $E_s$ is applied to the converter, the output of amplifiers 10 and 11 separate from one another in proportion to the magnitude of the applied signal so that one comparator operates at point A and the other at point B. The pulses produced at the output of comparators 16 and 17 at their point of operation serve to trigger flip-flops 19 and 20 to produce the pulses illustrated on line 44 of FIG. 4. These pulses applied to the input of logic circuit 23, together with the continuous train of pulses produced by master oscillator 22, produce at output 45 a number of pulses, as shown in FIG. 3 and FIG. 4, proportional to the magnitude of input signal $E_s$. The pulses produced at output 45 extend in time from the operation of one comparator to the operation of the other. The pulses of output 45 may then be applied to a counter so that the result may be displayed by a number of indicating devices.

If an undesirable 60 cycle noise signal is present, it will shift the point A by some increment in time $\Delta t$. The point B will also be shifted on line 43 in the same direction by the time $\Delta t \pm E$. E is the small error of the second order magnitude which is not completely removed. Disregarding the second order effect, it is observed that both the operating points A and B on line 43 are shifted by the undesirable 60 cycle noise in the same direction by the same amount $\Delta t$, so that the net error in the output pulses is zero. If the second order error E is smaller than the time distance between two consecutive output pulses, then there will be no effect on the output.

Referring to the above derived expressions, the desired rejection of a 60 cycle per second noise signal for full scale indication of a four digit voltmeter is $$\left(\frac{AE_n}{2V_0}\right)^2 \frac{w_n t_R}{2} = \frac{1}{10^4}$$

From which $E_n \approx 10$ millivolts for one volt full scale.

The 10 millivolt input noise or below will be completely rejected.

Without synchronization the 10 millivolt noise would produce ±100 counts at the display where master oscillator 22 produces 100,000 pulses/second. From actual measurement made on the converter for determining the noise rejection, the following results were obtained:

DC input

| Maximum noise rejected: | Mv. |
|---|---|
| 1 volt | 20 |
| .5 volt | 12 |
| .1 volt | 18 |

For signals of relatively large or relatively small amplitude, the noise rejection is, as shown in the table, better than the minimum noise rejection of 12 mv.

Thus it can be seen that the converter using a synchronized ramp according to the invention effects a definite improvement over non-synchronized systems.

Although the invention has been shown and described for illustrative purposes as applied to the diminution or elimination of noise of 60 cycle per second current, the invention is equally applicable to the diminution or elimination of noise of other frequencies, without departing from the spirit of the invention or the scope of the appended claims.

While only a single embodiment of the present invention has been shown and described, it is obvious that modifications may be made therein without departing from the nature and scope of the invention as defined in the appended claims.

What is claimed is:

1. Apparatus for measuring a D.C. voltage substantially free and independent of a continuously varying and interfering A.C. voltage superimposed on the D.C. voltage, comprising a ramp voltage generator substantially synchronized with the interfering A.C. voltage, means for comparing a sweep of said ramp voltage against the D.C. voltage and the superimposed interfering A.C. voltage in its inverted and non-inverted forms to thereby produce two output signals at two points along the ramp which correspond to the D.C. voltage to be measured, said means being responsive to changes in the A.C. voltage to change said two points without subst antially altering the time interval between said two points, so that the time interval between of the interfering A.C. voltage, and means for indicating the magnitude of said time interval as an indication of said D.C. voltage to be measured.

2. Apparatus as defined in claim 1 in which the indicating means includes a pulse generator and a counter for counting the number of generated pulses occurring within the time interval between the two points.

3. Apparatus as defined in claim 1 in which the means for comparing includes two comparators to which opposing phases of the D.C. voltage to be measured are applied along with the superimposed A.C. voltage.

4. In an apparatus for converting an incoming analog signal to a series of pulses the number of which will be indicative of the magnitude of the analog signal substantially without noise from an A.C. source of voltage, comprising two comparators to which opposing phases of the analog signal are respectively applied along with the accompanying noise of the A.C. source, a ramp generator coupled to both comparators, a synchronizing circuit connected to the A.C. noise source and coupled to said ramp generator for producing a signal for a time interval which is less than the period of the fundamental current of the A.C. source, each comparator producing a trigger pulse at a point in time which is modified by the noise component of said A.C. source, the trigger pulse obtained from one comparator being produced when the ramp generator reaches a first predetermined level and the trigger pulse of the other comparator being produced when the ramp generator reaches another predetermined level, and means responsive to the two trigger pulses for generating a plurality of counting pulses corresponding to the time interval between said trigger pulses, whereby the noise component introduced by said A.C. source is substantially neutralized.

5. An apparatus defined by claim 4 in which the generating means comprises a source of recurring pulses, switching means for converting each trigger pulse into a gating pulse, and logic means controlled by said gating pulses for counting the recurring pulses to determine the magnitude of the analog signal, substantially unaffected by the noise component introduced by the A.C. source.

6. In combination, a system for converting low level analog signal to pulse count digit indicative of the magnitude of the analog signal while rejecting 60 cycle noise signals comprising:

means for producing a timed signal of predetermined time interval responsive to the zero-crossing of said 60 cycle noise signal, said signal having a predetermined time interval slightly less than a cycle of said 60 cycle noise signal, a ramp generator coupled to said timing signal means for producing a saw-tooth ramp signal during said predetermined time interval, amplifier means for generating positive and negative signals proportional to the analog signal to be digitalized together with the noise signal, a first comparison circuit having one input coupled to said ramp signal and the other coupled to said positive signal, the output of said comparison circuit producing a first trigger pulse when said ramp signal reaches a critical operation level established by said positive signal, a second comparison circuit having one input coupled to said ramp signal and the other input coupled to said negative signal, the output of said comparison circuit producing a second trigger pulse when said ramp signal reaches a critical operation level established by said negative signal.

first switch means for converting said first trigger pulse from said first comparison circuit to a gating pulse having time duration occurring simultaneously with said ramp signal.

second switch means coupled to said second comparison circuit for converting said second trigger pulse to a gating pulse having time duration occurring simultaneously with said ramp signal, a source of recurring pulses, a logical circuit connected to said first, and said second switch means and said pulse source for producing an output during the coincidence of said gating pulses and said count pulses, said output of said logic means occurring simultaneously during said ramp signal and synchronized with said noise signal and having a time duration directly proportional to the magnitude of said analog signal to be digitalized.

7. The system as recited in claim 6 wherein said timing means comprises:

a zero-crossing detector having its input coupled to a 60 cycle source for producing a pulse for each zero-crossing of said 60 cycle noise signal, and
a monostable multivibrator coupled to the output of said detector for producing a pulse with said predetermined duration.

8. The system as recited in claim 7 wherein said amplifier means comprises:
a first amplifier for increasing the amplitude of the low level analog signal to produce said positive signal, and
a second amplifier coupled to the output of said first amplifier and having a unity gain to produce said negative signal.

9. The system as recited in claim 8 wherein said first and second switch means comprise flip-flop circuits.

10. The system as recited in claim 9 wherein said pulse source comprises a master oscillator for producing a continuous train of timed short duration pulses.

11. The system as recited in claim 10 wherein the output of each of said comparison circuits comprises a saw tooth ramp signal shifted in the same direction by the same interval of time with respect to said timed signal, said shift being proportional to the magnitude of said 60 cycle noise signal.

12. The method of measuring a D.C. voltage substantially without distortion due to a continuously varying and interfering A.C. voltage superimposed on the D.C. voltage, which consists of, generating a ramp voltage in synchronism with the interfering A.C. voltage, comparing a sweep of said ramp voltage against the D.C. voltage and the superimposed interfering A.C. voltage in its inverted and non-inverted forms to produce two output signals at two points along the ramp which correspond to the D.C. voltage being measured, so that the time interval between said two points will be substantially free and independent of the interfering A.C. voltage, and determining the magnitude of said time interval as an indication of said D.C. voltage being measured.

13. A method according to claim 12 which includes the step of generating pulses between the two specified points of the ramp voltage, the number of pulses corresponding to the D.C. voltage to be measured.

References Cited

UNITED STATES PATENTS

| | | | |
|---|---|---|---|
| 3,258,764 | 6/1966 | Muniz et al. | 340—347 |
| 3,368,149 | 2/1968 | Wasserman | 324—99 |

RUDOLPH V. ROLINEC, Primary Examiner

E. F. KARLSEN, Assistant Examiner

U.S. Cl. X.R.

324—120; 340—347

UNITED STATES PATENT OFFICE
CERTIFICATE OF CORRECTION

Patent No. 3,534,257 October 13, 1970

Stanley H. Charap et al.

It is certified that error appears in the above identified patent and that said Letters Patent are hereby corrected as shown below:

Column 7, line 62, after "between" insert -- said two points will be substantially free and independent --. Column 8, line 65, before "circuit" cancel "logical" and insert -- logic --.

Signed and sealed this 6th day of April 1971.

(SEAL)
Attest:

EDWARD M.FLETCHER,JR.
Attesting Officer

WILLIAM E. SCHUYLER, JR.
Commissioner of Patents